United States Patent
Bass

(10) Patent No.: US 11,203,329 B2
(45) Date of Patent: Dec. 21, 2021

(54) HYDRAULIC MASTER CYLINDER, A VEHICLE BRAKING SYSTEM AND A VEHICLE

(71) Applicant: AP Racing Limited, Coventry (GB)

(72) Inventor: Richard Bass, Coventry (GB)

(73) Assignee: AP RACING LIMITED, Coventry West Midlands (GB)

( * ) Notice: Subject to any disclaimer, the term of this patent is extended or adjusted under 35 U.S.C. 154(b) by 0 days.

(21) Appl. No.: 16/312,034

(22) PCT Filed: Jun. 19, 2017

(86) PCT No.: PCT/GB2017/051779
§ 371 (c)(1),
(2) Date: Dec. 20, 2018

(87) PCT Pub. No.: WO2017/220980
PCT Pub. Date: Dec. 28, 2017

(65) Prior Publication Data
US 2019/0375389 A1    Dec. 12, 2019

(30) Foreign Application Priority Data

Jun. 21, 2016 (GB) ..................................... 1610808

(51) Int. Cl.
| | |
|---|---|
| *B60T 13/14* | (2006.01) |
| *B60T 11/16* | (2006.01) |
| *B60T 11/232* | (2006.01) |

(52) U.S. Cl.
CPC ............. *B60T 13/145* (2013.01); *B60T 11/16* (2013.01); *B60T 11/232* (2013.01)

(58) Field of Classification Search
CPC ....... B60T 13/145; B60T 11/232; B60T 11/16
See application file for complete search history.

(56) References Cited

U.S. PATENT DOCUMENTS

| | | | |
|---|---|---|---|
| 4,199,949 A | | 4/1980 | Cadeddu |
| 4,440,452 A | * | 4/1984 | Burckhardt ............. B60T 8/261 188/106 R |

(Continued)

FOREIGN PATENT DOCUMENTS

| | | | |
|---|---|---|---|
| DE | 2246390 A1 | 3/1974 | |
| DE | 3815731 A1 | * 11/1989 | ................ B60T 8/38 |

(Continued)

OTHER PUBLICATIONS

Etienne-Nickitas, Athina, "International Preliminary Report on Patentability for International Application No. PCT/GB2017/051779," The International Bureau of WIPO, dated Dec. 25, 2018.

(Continued)

*Primary Examiner* — Xuan Lan Nguyen
(74) *Attorney, Agent, or Firm* — Florek & Endres PLLC

(57) ABSTRACT

A hydraulic brake master cylinder (12) for a vehicle braking system defines a first smaller fluid path (70, 50, 56, 34, 42, 44) and a second larger fluid path (72, 50, 56, 34, 44, 42) for connecting a working chamber (32) with a fluid reservoir at ambient pressure when the cylinder piston (28) is retracted and the brakes are not applied. A pressure relief valve (76) normally closes the second fluid path but is arranged to open when subject to a pressure differential at or above a threshold value. The first fluid path allows a restricted return flow of fluid to the reservoir should a standard knock-back event occur. If a larger knock-back event occurs causing a fluid pressure spike at or above the threshold value, the pressure relief valve (76) opens to allow a higher volume return flow through the second fluid path to dissipate the pressure quickly.

19 Claims, 8 Drawing Sheets

(56) References Cited

U.S. PATENT DOCUMENTS

| | | | | |
|---|---|---|---|---|
| 4,736,768 | A * | 4/1988 | Tsubouchi | B60T 11/232 |
| | | | | 137/493.3 |
| 5,535,590 | A | 7/1996 | Nies | |
| 5,778,673 | A * | 7/1998 | Poertzgen | B60T 7/042 |
| | | | | 60/577 |
| 6,438,955 | B1 * | 8/2002 | Chiba | B60T 11/20 |
| | | | | 60/578 |
| 7,926,268 | B2 * | 4/2011 | Egawa | B60T 11/232 |
| | | | | 60/585 |
| 2005/0231028 | A1 * | 10/2005 | Tsubouchi | B60T 8/38 |
| | | | | 303/115.1 |

FOREIGN PATENT DOCUMENTS

| | | | | |
|---|---|---|---|---|
| DE | 4303269 | C1 * | 3/1994 | ............ B60T 11/232 |
| EP | 0850814 | A2 | 7/1998 | |
| EP | 1967427 | A1 | 9/2008 | |
| FR | 2094823 | A5 * | 2/1972 | ............ B60T 11/232 |
| FR | 2828463 | A1 | 2/2003 | |
| JP | 2001180471 | A1 | 7/2001 | |
| JP | 2005297913 | A | 10/2005 | |

OTHER PUBLICATIONS

Kyriakides, D. "International Search Report and Written Opinion of the International Searching Authority for International Application No. PCT/GB2017/051779," European Patent Office, dated Sep. 20, 2017.

Wright, Mon, "Examination Report for Patent Application No. GB151080.6" United Kingdom Intellectual Property Office, dated Mar. 29, 2021.

* cited by examiner

HYDRAULIC MASTER CYLINDER, A VEHICLE BRAKING SYSTEM AND A VEHICLE

TECHNICAL FIELD OF THE INVENTION

The present invention relates to a hydraulic master cylinder for use with a vehicle braking system. The invention also relates to a vehicle brake system and a vehicle comprising such a hydraulic master cylinder.

BACKGROUND TO THE INVENTION

In known vehicle hydraulic braking systems which incorporate disc brakes, the brake pads are usually withdrawn from the surface of the brake disc rotor by a small amount when the brakes are not being applied to prevent the pads dragging on the discs. This results in a small amount of dead pedal travel when the brakes are actuated before the pads contact the rotor and fluid pressure is built up in the system. However, under certain circumstances the brake disc rotor can be deflected, pushing the pads and the associated pistons into a more retracted position with the hydraulic fluid being forced back into the master cylinder. This is known as brake pad "knock-back" or "knock-off" and results in excessive pedal travel when the brakes are next actuated. In severe cases, it is necessary to pump the pedal in order to take up the increased clearances.

It is known from WO 2007/012877 A1 to incorporate a valve in the brake line between the master cylinder and the brake calipers which restricts the return flow of hydraulic fluid from the calipers to the master cylinder in order to reduce the effects of brake pad knock-back.

It is also known from U.S. Pat. No. 3,269,409 to provide a check valve to control the flow of hydraulic fluid through the pressure outlet of a working chamber of a brake master cylinder which restricts the return flow of fluid into the working chamber.

Both of these known arrangements are relatively complex as they must allow an unrestricted flow of hydraulic fluid under pressure to pass through the valve from the master cylinder to the brake cylinders, a relatively high flow of fluid in the return direction from the brake cylinders to the master cylinder when the brake pedal is initially released and a restricted return flow through the valve when the brakes are not being applied. Furthermore, since both valve arrangements are in the pressurised part of the system, they may have some effect on the operation of the brakes when the brakes are applied under normal operating conditions.

There is a need therefore, for an improved hydraulic brake system for a vehicle which overcomes, or at least mitigates, some or all of the disadvantages of the known system.

There is in particular a need for an alternative hydraulic brake master cylinder which overcomes, or at least mitigates, some or all of the disadvantages on the known brake master cylinders.

SUMMARY OF THE INVENTION

In accordance with a first aspect of the invention, there is provided a hydraulic brake master cylinder comprising a body having a bore, a piston slidably mounted in the bore for movement between a retracted position and forward advanced positions, the piston having a seal which engages to bore to define a working chamber in the bore in front of the piston seal and a low pressure chamber behind the piston seal, a pressure outlet port from the working chamber for connection with one or more brake cylinders; wherein the master cylinder defines first and second fluid flow paths for fluidly connecting the working chamber with a source of ambient pressure when the piston is in the retracted position, the first fluid flow path having a minimum cross sectional area which is smaller than the minimum cross sectional area of the second fluid flow path, a pressure relief valve in the second fluid flow path which is arranged to open to connect the working chamber to the source of ambient pressure through the second flow path when subject to a pressure differential across the valve at or above a threshold value.

In the hydraulic brake master cylinder according to the first aspect of the invention, the working chamber is in permanent fluid connection with the source of ambient pressure through the first fluid flow path when the piston is in the retracted, at rest, position when the brakes are not being applied whilst the second fluid flow path is normally closed by the pressure relief valve. This allows a restricted return flow of fluid from the brake cylinders through the working chamber and first fluid flow path towards source of ambient pressure in order to limit the effects of brake pad knock-back when used as part of a hydraulic braking system comprising disc brakes fluidly connected with the working chamber. However, should a particularly large knock-back event occur giving rise to a large increase in fluid pressure on the working chamber side of the pressure relief valve at or above the threshold value, the pressure relief valve opens to fluidly connect the working chamber to the source of ambient pressure and to allow fluid to flow in the return direction from the working chamber to the source of ambient pressure through the second flow path. Since the second flow path is larger than the first fluid flow path, this allows the excess pressure to be quickly dissipated and protects the system from high pressure spikes which might otherwise damage the hydraulic braking system. It is a particular advantage that the first and second flow paths and the pressure relief valve do not form part of the pressurised side of system when the brakes are applied and so have no effect on the normal application and release of the brakes.

The threshold value at which the pressure relief valve opens may be set at 100 kPa or more, or 200 kPa or more, or 240 kPa or more, or is in the range of 200 kPa to 300 kPa.

The pressure relief valve is configured to open when subject to a higher fluid pressure on the working chamber side of the valve member than on the side fluidly connected with the source of ambient pressure. The pressure relief valve may comprise a movable valve member biased to a valve closed position by a resilient member such as a spring. In this case, the bias force (spring force) applied by the resilient member to the movable valve member determines the threshold value of the pressure differential at which the valve opens. The first and second fluid flow paths are closed when the piston is advanced from the retracted position to apply the brakes.

In an embodiment, the source of ambient pressure is a brake fluid reservoir, and the master cylinder has a reservoir port for fluid connection with the reservoir, the first and second flow paths fluidly connecting the working chamber with or through the reservoir port.

In an embodiment, the first and second flow paths are at least partly defined by means of a cut-off port in the body fluidly connecting the bore and the reservoir port, the cut-off port opening into the bore at a location which is in front of the piston seal within the working chamber when the piston is in the retracted position but which is passed by the piston seal as the piston is moved from the retracted position towards an advanced position, such that the working chamber is fluidly isolated from cut-off port once the piston seal has moved past the cut-off port.

In an embodiment, the second flow path comprises a fluid flow passageway fluidly connected with the cut-off port via an inlet, the pressure relief valve comprising a valve member in the passageway which is biased into engagement with a valve seat about the inlet, the first flow path comprising a restricted port through the valve member permanently fluidly connecting the inlet and the flow passageway, the valve member being movable away from the valve seat to allow fluid to flow through the passageway towards the source of ambient pressure about the valve member when the fluid pressure acting on the inlet side of the valve member is at or above said threshold value.

In an alternative embodiment, the first and second fluid flow paths are at least partially defined through the piston.

In one embodiment, the master cylinder comprises a fluid chamber defined within the piston, the piston chamber having an outlet directed into a low pressure region of the bore behind the piston seal, a pressure release valve for controlling the flow of fluid from the piston chamber into the low pressure chamber, which pressure release valve is opened when the piston is in the retracted position and which closes when the piston is moved away from the retracted position towards an advanced position, the first flow path including at least one first port in the piston fluidly connecting the piston chamber with the working chamber, the second flow path including at least one second port in the piston fluidly connecting the piston chamber with the working chamber, the pressure relief valve arranged to control the flow of fluid into the piston chamber from the working chamber through the at least one second port.

The pressure release valve may comprise a valve member located in the piston chamber and movable between a closed position in which it engages with a valve seat to close the outlet and an open position in which it is spaced from the valve seat to permit fluid to flow from the piston chamber in to the low pressure chamber through the outlet, the valve member being biased towards the closed position by a resilient member, and a mechanism for moving the valve member to the open position as the piston approaches the retracted position.

The mechanism may comprise a projection mounted to one of the body and the valve member and which extends through the outlet for engagement with the other of the valve member and the body when the piston is in the retracted position to move the valve member to the open position.

There may be two or more first ports radially spaced apart, each first port fluidly connecting the piston chamber to the working chamber.

In an embodiment, the piston chamber has an inlet through which fluid passing through the at least one second port enters the piston chamber, the pressure relief valve being operative to control the flow of fluid through the inlet passage from the at least one second port in to the piston chamber.

There may be two or more second ports fluidly interconnected with the inlet passage to the piston chamber.

The pressure relief valve may comprise a valve member located in the piston chamber and which is biased into engagement with a valve seat to close the inlet to the piston chamber, the valve member being movable away from the valve seat to open a flow path to allow fluid to flow through the inlet from the working chamber into the piston chamber when the pressure differential across the valve member is at or above said threshold values and the pressure release valve is open.

The movable valve members for the pressure relief valve and the pressure release valve may both mounted in the piston chamber and biased to their respective closed positions by a common compression spring operatively connected between them.

In accordance with a second aspect of the invention, there is provided a vehicle braking system comprising a hydraulic brake master cylinder in accordance with the first aspect of the invention, the working chamber outlet port of the brake master cylinder being fluidly connected with at least one brake cylinder in at least one disc brake caliper.

In accordance with a third aspect of the invention, there is provided a vehicle comprising a braking system in accordance with the second aspect of the invention.

DETAILED DESCRIPTION OF THE INVENTION

Several embodiments of the invention will now be described, by way of example only, with reference to the accompanying drawings, in which.

Figure 1:
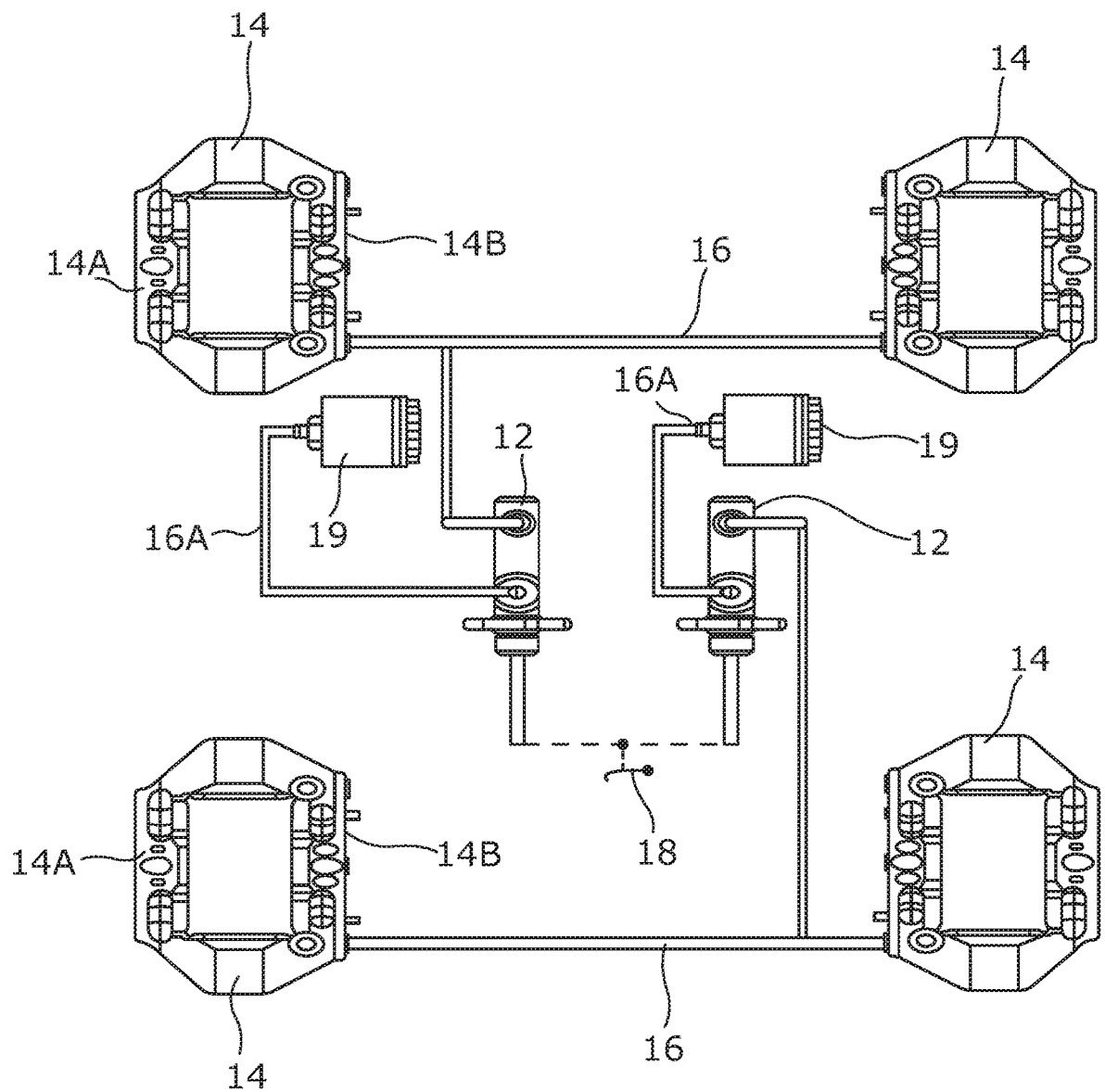
FIG. 1 is a schematic representation of an embodiment of a braking system for a vehicle in accordance with an aspect of the invention.

FIG. 1 illustrates one embodiment of a hydraulic braking system 10 for a vehicle such as a motor car. The braking system 10 comprises a pair of brake master cylinders 12. Each brake master cylinder is connected with the hydraulic brake cylinders in a pair of disc brake calipers 14 by hydraulic lines 16. Typically, the calipers 14 associated with one master cylinder 12 are arranged to brake the front wheels in a motor car and the other pair the rear wheels. The master cylinders 12 are operatively connected with a common brake actuator 18 in the form of a brake pedal. When the brake pedal 18 is depressed, both master cylinders 12 are operated at the same time to apply the brakes. Each master cylinder is also fluidly connected with a brake fluid reservoir, illustrated schematically at 19, by means of further hydraulic lines 16A. The reservoirs hold a supply of brake fluid at ambient pressure.

As is well known, each disc brake caliper 14 has a pair of fixed opposed limbs 14A, 14B and straddles a respective disc brake rotor (not shown) with a limb on either side. Each limb has one or more hydraulic brake cylinders, each cylinder having a piston which is advanced when pressurised fluid is introduced into the cylinder on actuation of the respective master cylinder 12 to press a brake pad against a surface of the rotor. When the brake pedal 18 is released, the pistons in the calipers are drawn back into their respective cylinders by a small amount to ensure the pads do not rub on the rotors and brake fluid is returned to the master cylinder 12.

It should be appreciated that the braking system 10 as illustrated in FIG. 1 is only one possible embodiment of a braking system in accordance with the invention. For example, it is not essential that a braking system in accordance with the invention have two master cylinders 12. The invention can be equally applied to braking system for a motor car having a single master cylinder for actuating disc brakes on all four wheels or for actuating disc brakes on the front of vehicle and drum brakes on the rear. The invention can also be applied to a tandem master cylinder having two working chambers, where one working chamber is typically connected with the front brakes and the other to the rear brakes in a motor vehicle. Furthermore, the invention can be applied to a braking system for a motor cycle in which a single master cylinder is used to actuate a pair of disc brake calipers, one at the front and one of the rear. Particularly in this later case, the brake actuator 18 may be a lever rather than a brake pedal, indeed any suitable type of actuator 18 can be used in any of the systems. The reservoir 19 may be mounted directly on the brake master cylinder or it may be located remotely from the brake master cylinder.

Several embodiments of a brake master cylinder in accordance with an aspect of the invention will now be described with reference to FIGS. 2 to 8. The same reference numbers but increased by 100 in each case will be used to identify features in each embodiment that are the same or which carry out the same or a similar function. The master cylinders described herein are particularly suited for incorporation in a vehicle braking system, such as that shown in FIG. 1 and the variations discussed above.

For the avoidance of doubt, the terms "forward" and "rearward" and the like used herein in relation to the brake master cylinders are not intended to imply any particular required orientation of the cylinders when mounted to a vehicle.

Figure 2:
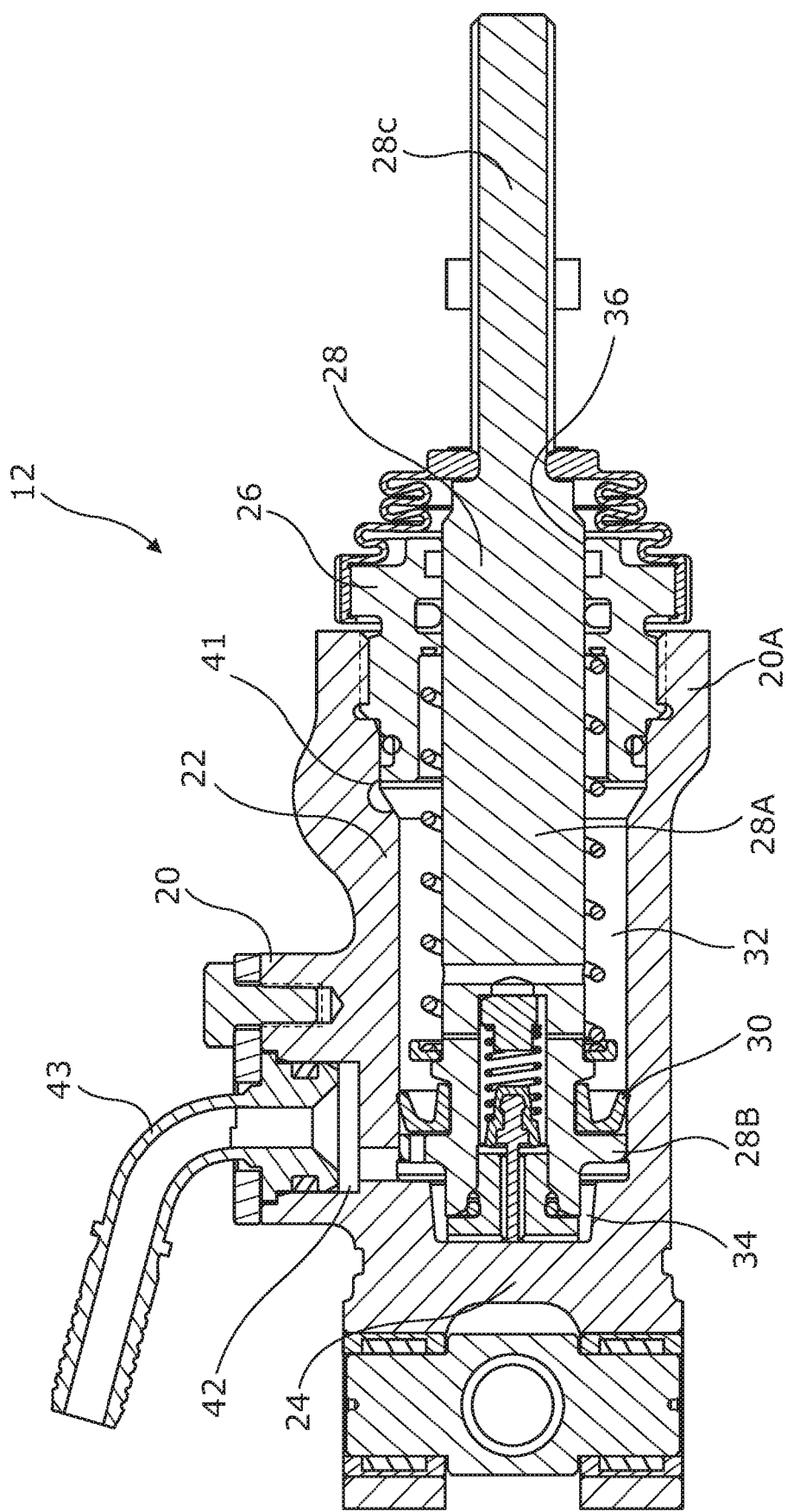
FIGS. 2 to 4 are a series of somewhat schematic, longitudinal cross sectional views through one embodiment of a brake master cylinder in accordance with an aspect of the invention and which can be adopted in the braking system of FIG. 1, the various views illustrating the master cylinder under different operating conditions.
Figure 3:
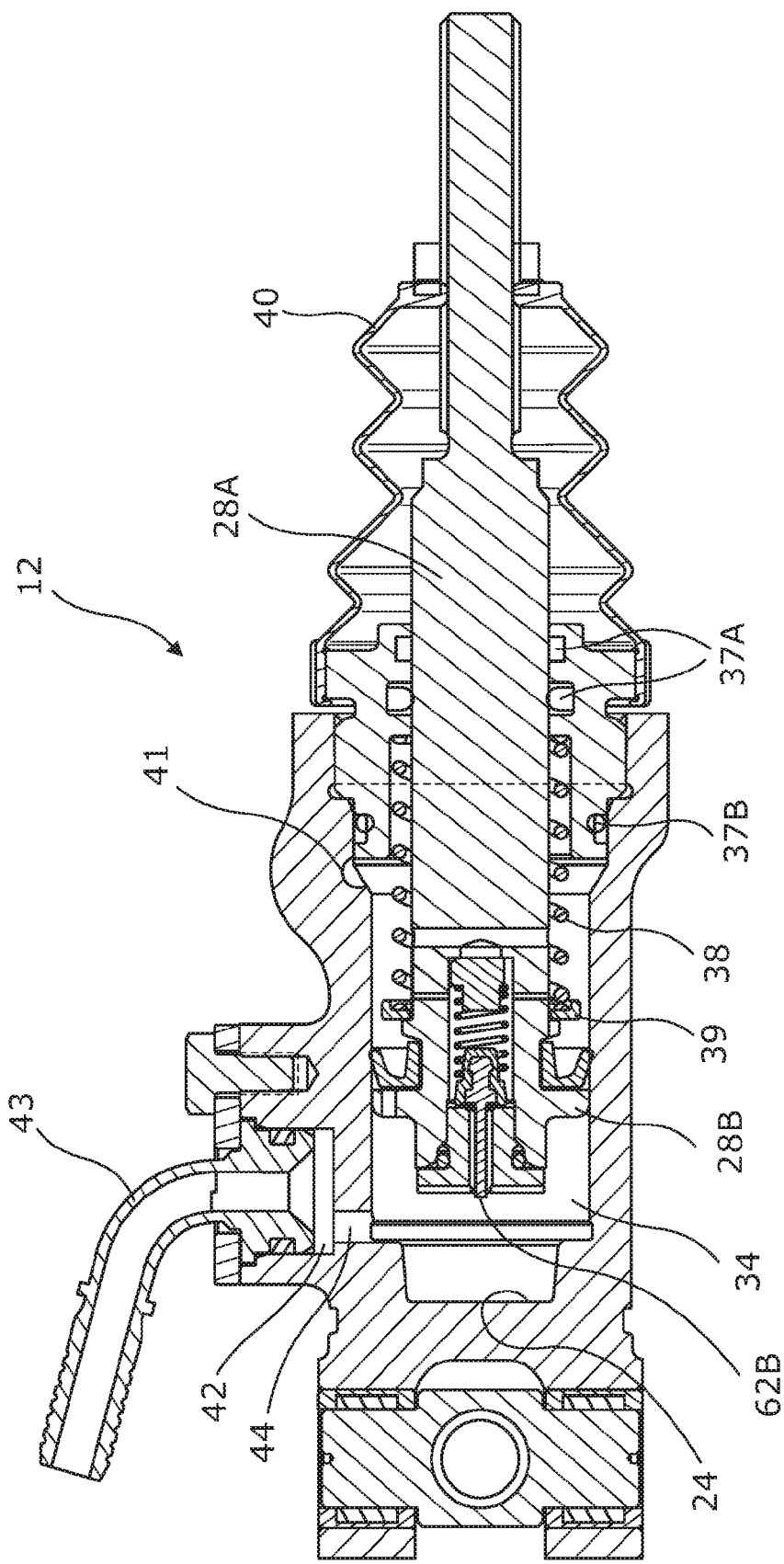
Figure 4:
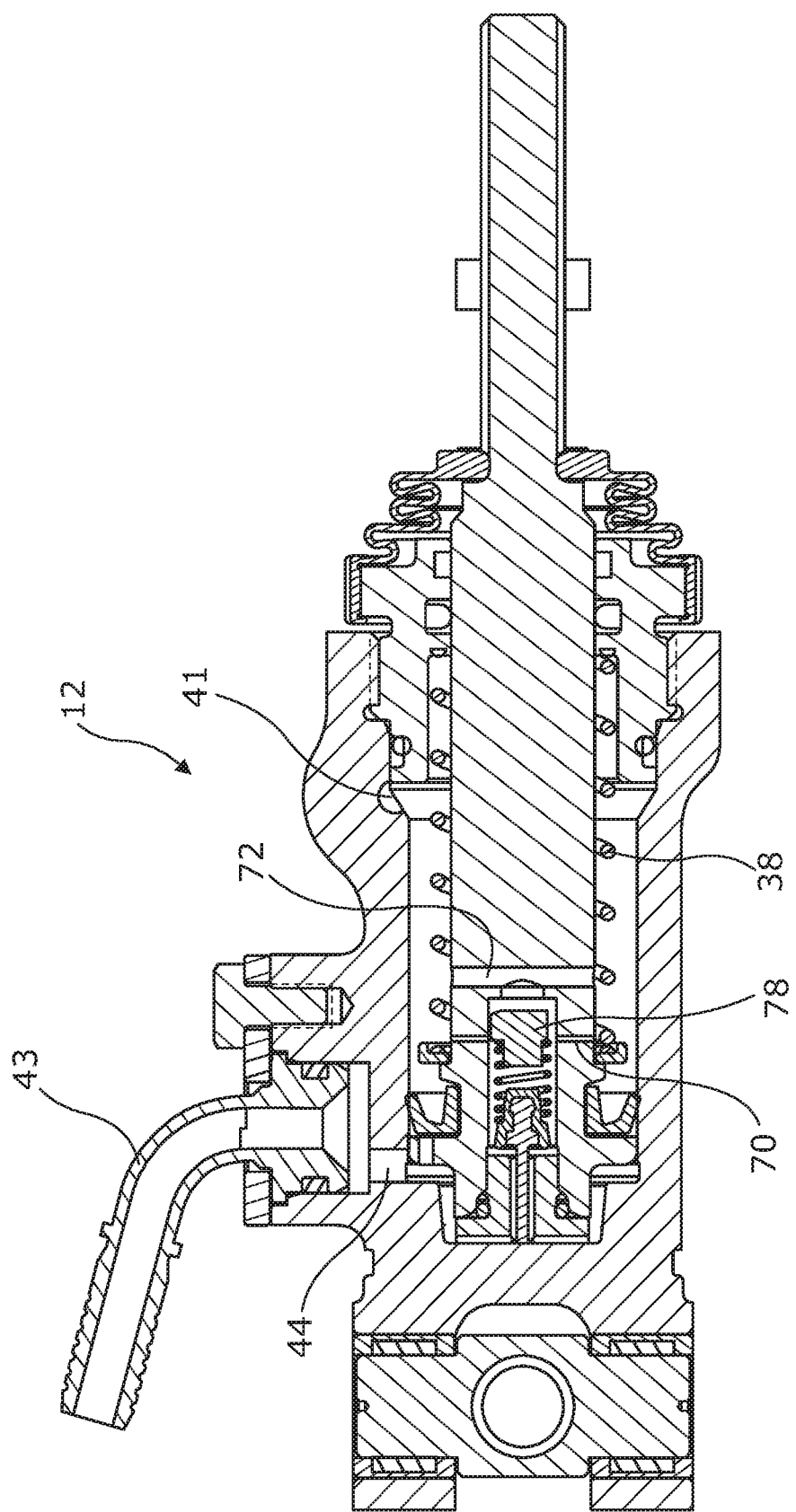

A first embodiment of a brake master cylinder 12 in accordance with an aspect of the invention is illustrated in FIGS. 2 to 4. The brake master cylinder 12 has a body 20 with a main body portion 20A which defines a blind bore 22 closed at a reward end by a wall 24 of the main body portion. The bore 22 is closed at a forward end by means of an end cap 26 which is mounted to the main body portion 20A by means of inter-engaging threads or any other suitable arrangement and forms part of the body 20.

A piston 28 is slidably received in the bore 22. The piston 28 has an elongate, generally cylindrical section 28A having an outer diameter which is significantly less than that of the bore so that an annular volume is defined within the bore about the cylindrical section. An annular flange 28B projects radially outwardly from the cylindrical section close to a rearward end of the piston. The outer diameter of the annular flange 28B is only slightly smaller than that of the bore 22. A lip or cup seal 30 is mounted about the cylindrical section 28A of the piston and abuts a forward facing side of the radial flange 28B. The piston seal 30 engages with the wall of the bore 22 with a sliding seal to define a working chamber 32 in the annular volume surrounding the cylindrical portion 28A of the piston in front of the piston seal 30 and a low pressure chamber 34 in the region of the bore 22 behind the piston seal.

The cylindrical portion 28A of the piston 28 extends forwardly through a central opening 36 in the end cap 26 and merges into a smaller diameter actuator rod section 28C. In this embodiment, the master cylinder is a pull type cylinder and the actuator rod section 28C is in the form of a pull rod which is connected by any suitable means to an actuator 18, such as a brake pedal. Seals 37A are mounted within the end cap 26 and engage the outer surface of the cylindrical portion 28A of the piston to prevent hydraulic fluid in the working chamber 32 from leaking out between the piston 28 and the end cap 26. Suitable seals 37B are also provided between the end cap 26 and the main body portion 20A to prevent hydraulic fluid from leaking out between them. The piston 28 is biased rearwardly to a retracted or rest position, as shown in FIG. 2, by means of a compression spring 38 located in the bore 22 about the cylindrical portion 28A of the piston and operative between a spring cup 39 mounted to the piston and the end cap 26. The piston 28 is drawn forwardly to an advanced position against the bias of the spring 38 when the brakes are applied by means of an actuator 18 pulling on the pull rod section 28C, as illustrated in FIG. 3. An extendable elastic boot 40 is mounted at one end about the exterior of the end cap 26 and at the other end to the actuator rod section 28C of the piston to protect that portion of the piston which slides in and out of the body when the master cylinder is actuator.

A working chamber outlet port 41 is defined in the body towards a forward end of the working chamber 32. A hydraulic line 16 can be connected with the outlet port 41 to fluidly connect the working chamber 32 with the brake cylinders in one or more disc brake calipers 14.

The body 20 also defines a reservoir port 42 which is adapted to receive a fluid connector or union 43 for fluidly connecting the reservoir port 42 to a fluid reservoir 19 which holds a reserve of hydraulic fluid. The reservoir could be mounted on the master cylinder body 20 or it may be mounted remotely.

The reservoir port 42 is fluidly connected to the low pressure chamber 34 by means of a fluid passage 44. The fluid reservoir 19 is generally at ambient pressure and since the low pressure chamber 34 is in permanent fluid connection with the fluid reservoir, it will also be at ambient pressure. In contrast, the working chamber 32 in front of the piston seal 30 is only in fluid connection with the fluid reservoir when the piston 28 is in the retracted position, as shown in FIG. 2. When the piston is moved forwardly towards an advanced position, as illustrated in FIG. 3, the working chamber 32 is fluidly isolated from the reservoir such that the fluid in the working chamber can be pressurised. Accordingly, the working chamber 32 can be considered a pressure chamber.

Figure 5:
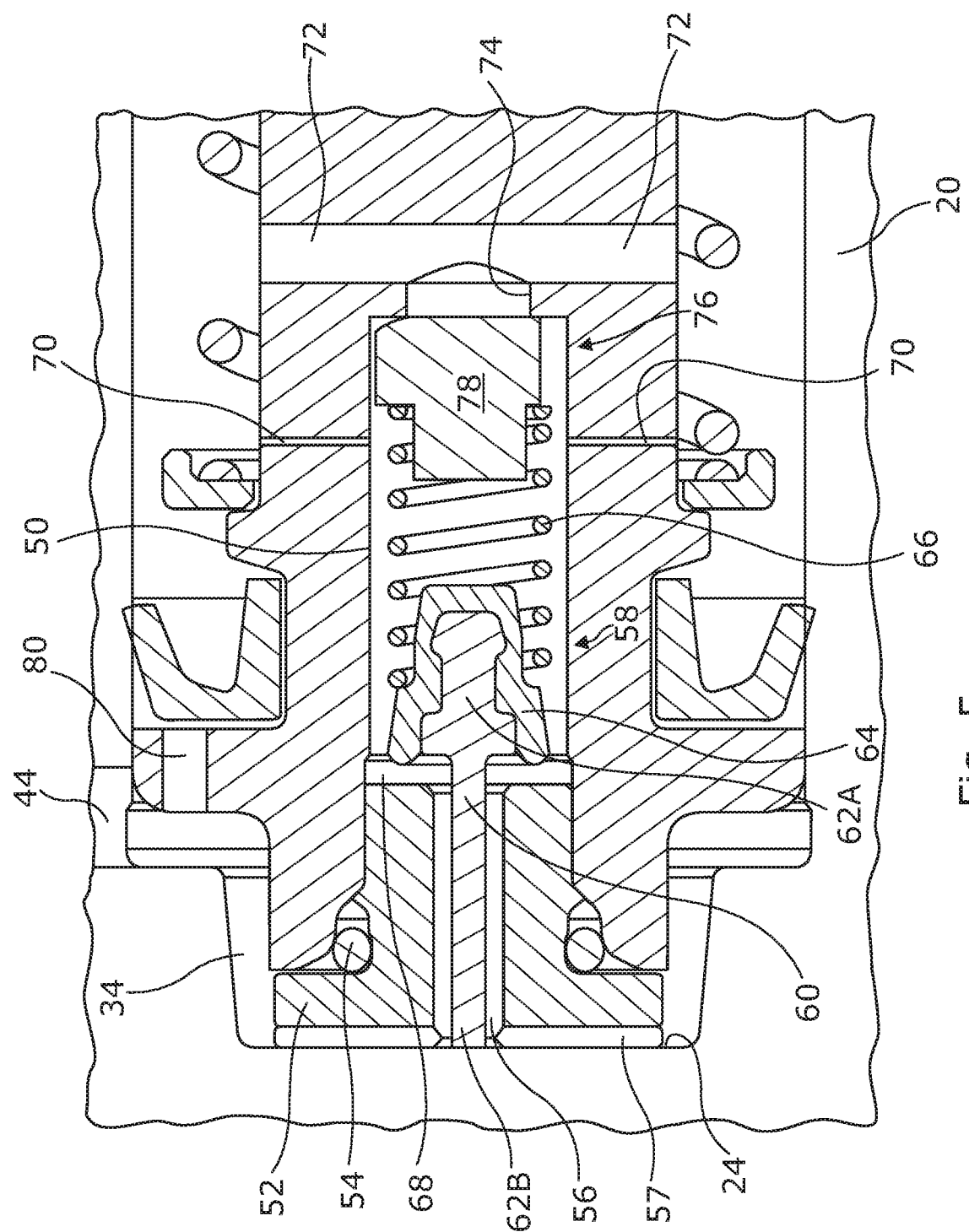
FIG. 5 is an enlarged view of part of the master cylinder of FIG. 2.

The arrangements by which the working chamber 32 is fluidly connected to the low pressure chamber 34 when the piston is in the retracted position will now be described with reference to FIG. 5 in particular.

A fluid chamber 50 is defined in an enlarged diameter rearward end of the cylindrical portion 28A of the piston 28. The fluid chamber 50 is closed at its reward end by a piston plug 52 which is attached to the cylindrical portion 28A by means of inter-engaging screw threads, or by any other suitable arrangement, and forms a part of the piston. A seal 54 is operative between the plug 52 and the cylindrical portion 28A to prevent hydraulic fluid from leaking between them. The plug 52 has a central orifice 56 fluidly connected with a number of radial grooves 57 in an outer end face of the plug 52. The orifice 56 and grooves 57 form a fluid connection between the piston chamber 50 and the low pressure chamber 34. The orifice 56 will be referred to as an outlet from the piston chamber, though fluid can pass through the orifice 56 and grooves 57 in either direction depending on the operating circumstances of the master cylinder 12. Fluid flow through the outlet orifice 56 is controlled by a pressure release valve 58. The pressure release valve 58 is opened when the piston 28 is in the retracted or at rest position when the brakes are not being applied to fluidly connect the piston chamber 50 and the low pressure chamber 34 but closes as the piston moves forwardly from the retracted position towards an advanced position to fluidly isolate the piston chamber 50 from the low pressure chamber 34 when the brakes are applied.

The pressure release valve 58 includes a movable valve member 60 which has a rigid core comprising a head portion 62A located inside the piston chamber 50 and an elongate stem 62B which projects through the outlet orifice 56. A flexible valve cup 64 is mounted about the head portion 62A. The pressure release valve member 60 is biased by means of a valve spring 66 rewardly to a closed position in which the valve cup 64 sealingly engages with an axial end face 68 of the plug about the outlet orifice 56. The axial end face 68 defining a valve seat. The stem 62B is longer than the plug 52 so that when the pressure release valve 60 is closed, as shown in FIG. 3, an end of the stem projects axially outwardly from the plug. The arrangement is configured so that as the piston 28 approaches the retracted position, the stem 62B engages the wall 24 at the rearward end of the bore 22, the valve spring 66 is compressed and the valve cup 64 is lifted off the axial end face 68 of the plug to open the pressure release valve and fluidly connect the piston chamber 50 and the low pressure chamber 34 through the outlet 56. In this regard, the bias force of the main piston spring 38 is considerably higher than that of the valve spring 66. When the piston 28 is moved forwardly as the brakes are applied, the pressure release valve 60 is closed by the valve spring 66 as the stem 62B piston moves away from the end wall 24.

The piston chamber 50 is fluidly connected with the working chamber 32 by means of restricted ports 70 extending radially through the cylindrical portion 28A of the piston. Two restricted ports 70 are shown in the Figures but there could be a single restricted port or more than two restricted ports. Typically, the restricted ports 170 are equispaced radially about the piston. The restricted ports 70 are permanently open so that the piston chamber 50 is fluidly connected to the working chamber 32 through the restricted ports 70 at all times.

The piston chamber 50 is also fluidly connected with the working chamber 32 by means of four further ports 72 extending radially through the cylindrical portion 28A of the piston. The further ports 72 are larger in diameter than the restricted ports 70 and are fluidly connected with the piston chamber 50 by means of an inlet passage 74 which is opened and closed by means of a pressure relief valve 76. The pressure relief valve 76 has a movable valve member 78 located inside the piston chamber 50 and which is biased into contact with the inner surface of the piston surrounding the inlet passage 74 by the valve spring 66, which acts in compression between the movable valve members 60, 78 of the pressure release valve 58 and the pressure release valve 76. The pressure relief valve 76 is normally held closed by the valve spring 66 but the pressure relief valve member 78 can be moved away from the surface of the piston to open the inlet passage 74 and allow fluid to flow through the further ports 72 into the piston chamber 50 from the working chamber if the pressure of the fluid in the working chamber 32 and further ports 72 acting on the valve member 78 is higher than the pressure of the fluid in the piston chamber 50 by a threshold amount. The number of further ports 72 can also be varied provided that the minimum cross sectional area for fluid flow through the restricted port or ports 70 into the piston chamber is smaller than the minimum cross sectional area for fluid flow through the further port or ports 72 and inlet passage 74, such that a higher volume flow rate of fluid can enter the piston chamber 50 when the pressure relief valve 76 is open than when it is closed.

Operation of the master cylinder 12 will now be described.

Under normal operating conditions with the piston 28 in the retracted position as shown in FIG. 1, the pressure release valve 60 is open, the pressure relief valve 76 is closed, and the working chamber 32 is fluidly connected with the reservoir 19 by means of the restricted ports 70, the piston chamber 50, the piston chamber outlet 56, the low pressure chamber 34, the fluid passage 44 and the reservoir port 42.

To apply the brakes, the brake pedal 18 is depressed causing the piston 28 to be pulled forwardly towards an advanced position as illustrated in FIG. 3. As the piston 28 moves away from the retracted position, the pressure release valve 60 closes, fluidly isolating the piston chamber 50 and the working chamber 32 from the reservoir. This allows the fluid in the working chamber 32, the hydraulic lines 16 and the brake cylinders in the calipers 14 to be pressurised applying the brake pads to the disc brake rotors. As the piston 28 moves forwardly from the retracted position, hydraulic fluid from the reservoir enters the low pressure chamber 34 in the bore. Since the piston chamber 50 is fluidly connected with the working chamber 32 via the restricted ports 70, the pressure of the fluid in the piston chamber 50 is equalised with that in the working chamber 32 and there is no pressure differential across the movable valve member 78. Accordingly, the pressure relief valve 76 remains closed and operation of the brakes is unaffected.

When the brake pedal 18 is released, the piston 28 is moved back to the retracted position by the main spring 24. Fluid in the low pressure chamber will move back into the reservoir though the fluid passage 44, although fluid passages 80 extending axially through the radial flange 28B of the piston allow some fluid to pass from the low pressure chamber 34 into the working chamber 32 past the piston seal 30 in a known manner. As the pressure falls in the working chamber 32 and the hydraulic lines 16, the pistons in the caliper brake cylinders are withdrawn a small amount under the action of the piston seals and fluid is returned to the working chamber.

As the piston approaches the retracted position, the pressure release valve 58 opens as the stem 62B contacts the end wall 24 of the bore 22. When the pressure release valve 58 opens, the working chamber 32 is fluidly connected with the low pressure chamber 34 via the restricted ports 70 and piston chamber 50 so that any remaining pressure in the working chamber 32 and hydraulic lines 16 is released and no pressure is retained in the system. This ensures the brake pads are fully released.

Should a knock-back event occur whilst the piston 28 is in the retracted position which gives rise to a pressure in the working chamber below the threshold value at which the pressure relief valve 76 is set to open, the pressure relief valve 76 remains closed and any volume of fluid that is displaced must pass through the restricted ports 70 to reach the piston chamber 50 and the low pressure chamber 34. The return flow in these circumstances is restricted, preventing a large volume of fluid from being displaced and limiting movement of the caliper brake cylinder pistons away from the disc brake rotor. In the event that a larger knock-back event occurs which gives rise to a pressure spike at or above the threshold value in the fluid acting on the working chamber side of the pressure release valve member 78, the pressure relief valve 76 opens to allow a larger volume flow rate of fluid to pass from the working chamber 32 into the piston chamber 50 and low-pressure chamber 34 through the further ports 72, which are larger than the restricted ports 70. This allows the excess pressure to be quickly dissipated and protects the system from high pressure spikes which might otherwise damage the hydraulic braking system.

The pressure relief valve 76 is set to open at a threshold value above which damage to the hydraulic system might occur and is determined by the force of the valve spring 66. The actual threshold value will vary but typically might be set at 100 kPa or more, or 200 kPa or more, or 240 kPa or more. The threshold value may be set in the range of 200 kPa to 300 kPa. In one embodiment, the threshold value is set at about 245 kPa.

In the brake master cylinder 12 in accordance with the invention, the restricted flow through the restricted ports 70 is used to limit the severity of a knock-back event whilst the further ports 72 and pressure relief valve 76 are operative to prevent damage to the system in the event of a relatively high pressure spike being generated due to a larger knock-back event. The restricted ports 70 define part of a first flow path for fluidly connecting the working chamber 32 to the reservoir port 42 when the piston is in the retracted position, whilst the further ports 72 and inlet passage 74 define part of a second flow path. A feature of the arrangement is that the first and second flow paths and the pressure relief valve 76 do not form part of the pressurised system when the brakes are applied. Accordingly, they have no effect on the normal application and release of the brakes.

Figure 6:
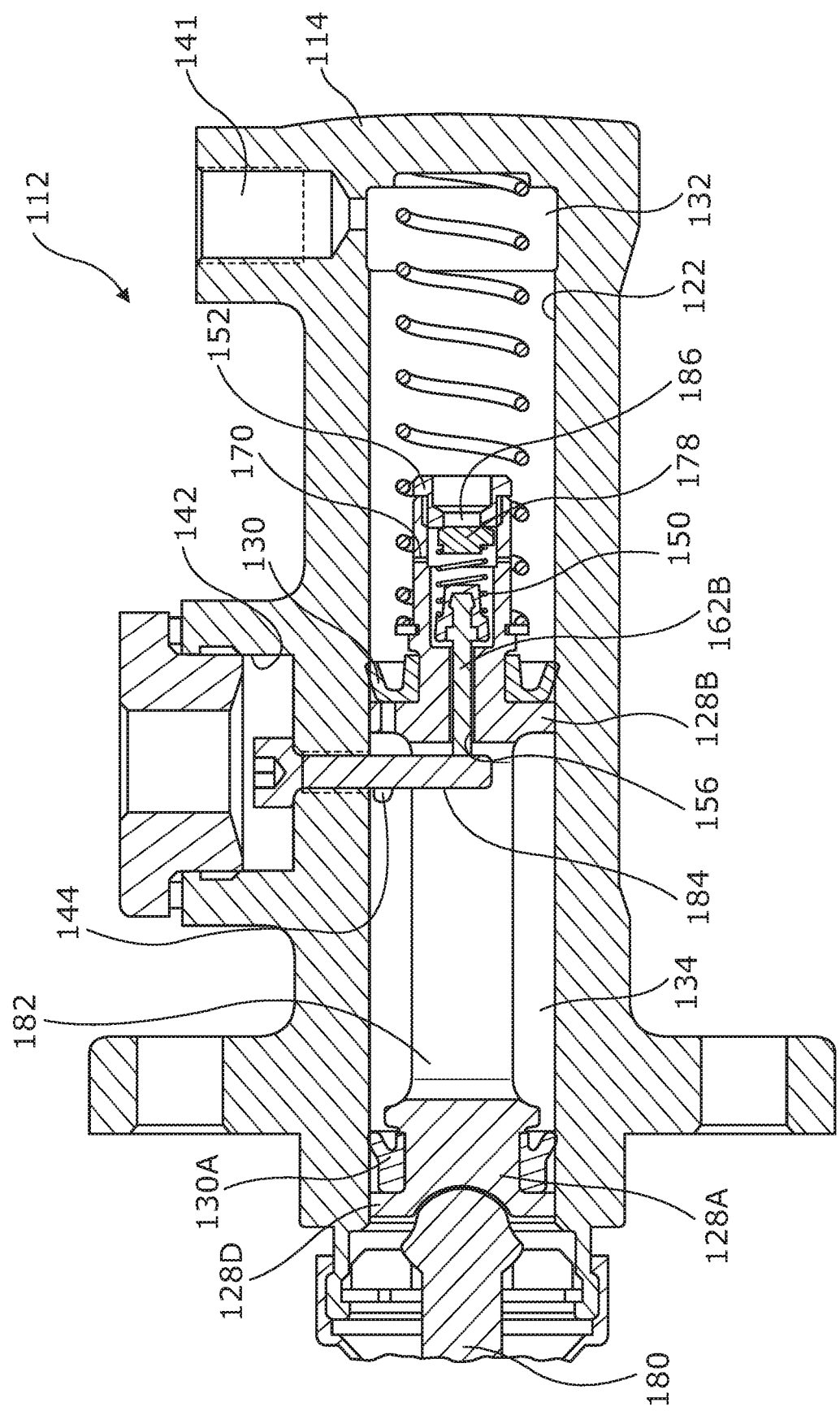
FIG. 6 is a view similar to that of FIG. 2 but showing a further embodiment of a brake master cylinder in accordance with an aspect of the invention and which can be adopted in the braking system of FIG. 1.

FIG. 6 illustrates a further embodiment of a brake master cylinder 112 in accordance with the invention. The brake master cylinder 112 is similar to the brake master cylinder 12 in accordance with the first embodiment, except that it is constructed to operate as a push type master cylinder. Only those features of the master cylinder 112 which differ significantly from those of the first embodiment 12 will be described in detail.

The brake master cylinder 112 has a push rod actuator 180 which engages with a rearward end of the piston 128 in a largely conventional manner. The piston 128 has a first radial flange 128B which projects radially from the cylindrical portion 128A at a position towards a forward end of the piston and supports a piston seal 130 to define a working chamber 132 in the bore 122 in front of the first piston seal 130. A low pressure chamber 134 is defined in the bore behind the first piston seal and a second radial flange 128D and a second piston seal 130A located at the rear end of the piston to prevent fluid from escaping from the low pressure chamber at the rear of the cylinder.

The piston chamber 150 is defined in a forward end region of the piston 128 and is closed at a forward end by means of a piston plug 152, which forms a part of the piston. An elongate through slot 182 is defined in the cylindrical portion 128A of the piston in the region between the first and second piston seals 130, 130A in the low pressure chamber 134. The outlet orifice 156 from the piston chamber 150 opens rearwardly into the through slot 182 and hence into the low pressure chamber 134, which is fluidly connected with the reservoir port 142 by a fluid passage 144. The stem 162B of the valve member of the pressure release valve projects through the outlet 156 into the slot 182 and engages with an abutment 184 mounted to the master cylinder body 114 when the piston 128 is in the retracted position. The abutment 184 in this case is in the form of a bolt or stud having a shank which projects into the slot 182. The slot 182 is dimensioned accommodate the abutment 184 as the piston moves forwardly from the retracted position by the required travel. The abutment though could take other forms provided it is fixed relative to the cylinder body 14.

In this embodiment, the second flow path comprises a central port or flow passage 186 through the piston plug 152 into the piston chamber 150 rather than a number of radial ports. The movable valve member 178 in the pressure relief valve is biased by the valve spring 166 into contact with an inner surface of the plug 162 about the opening to the passage 186, which comprises a valve seat.

In use, the brake master cylinder 112 operates substantially as described above in relation to the first embodiment 12. If a knock-back event occurs whilst the piston is in the retracted position with the pressure release valve open, fluid from the working chamber 132 is constrained to pass through the restricted ports 170 into the piston chamber 150 so that the severity of the knock-back event is limited. Should a large knock-back event occur causing the pressure to spike above the threshold value, the pressure relief valve will open to allow a larger, less restricted volume of fluid to pass through the port 186 into the piston chamber 150 to allow the pressure to dissipate quickly and reduce the risk of damage to the system.

Figure 7:
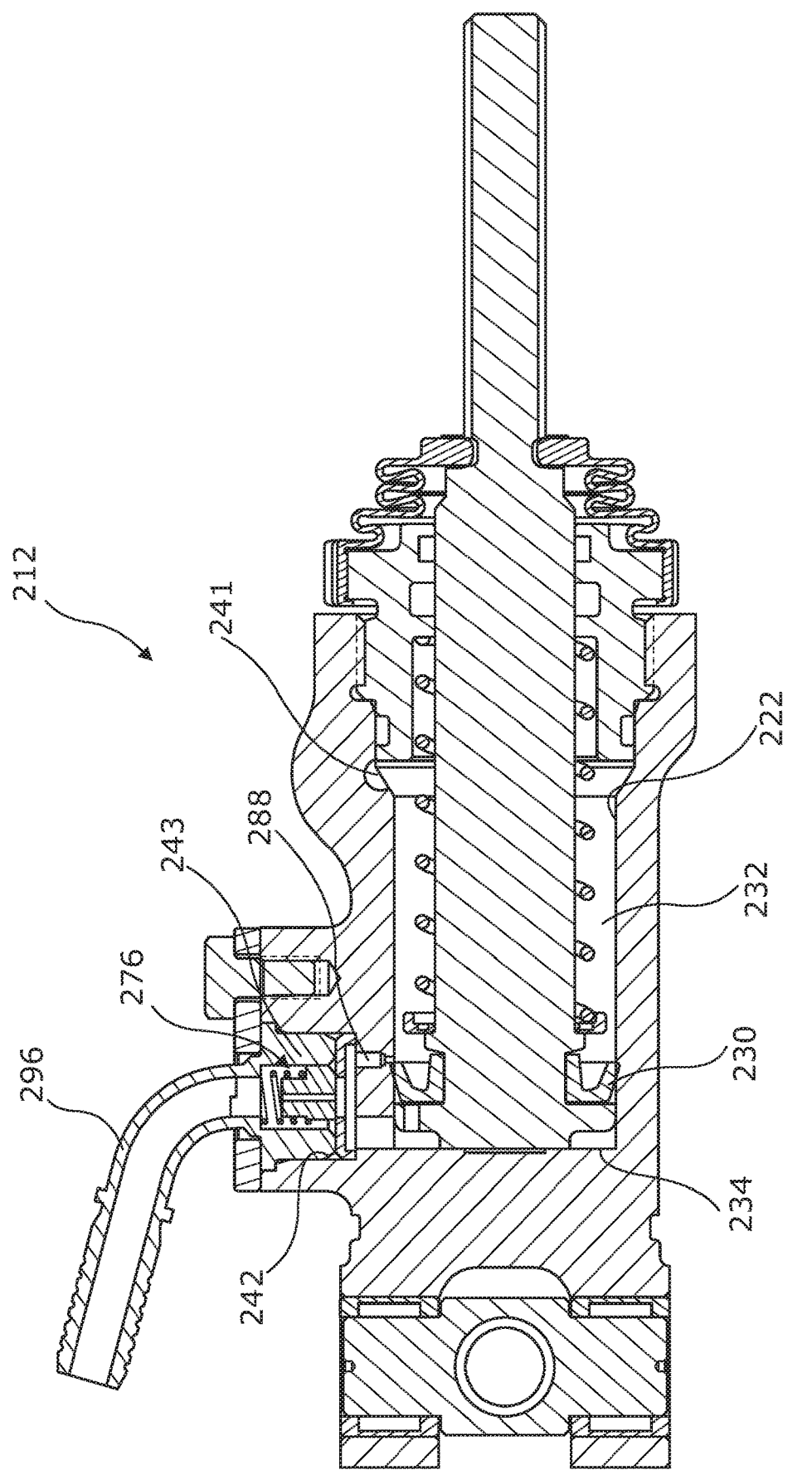
FIG. 7 is a view similar to that of FIG. 2 but showing a still further embodiment of a brake master cylinder in accordance with an aspect of the invention and which can be adopted in the braking system of FIG. 1; and, FIG. 8 is an enlarged view of part of the master cylinder of FIG. 7.
Figure 8:
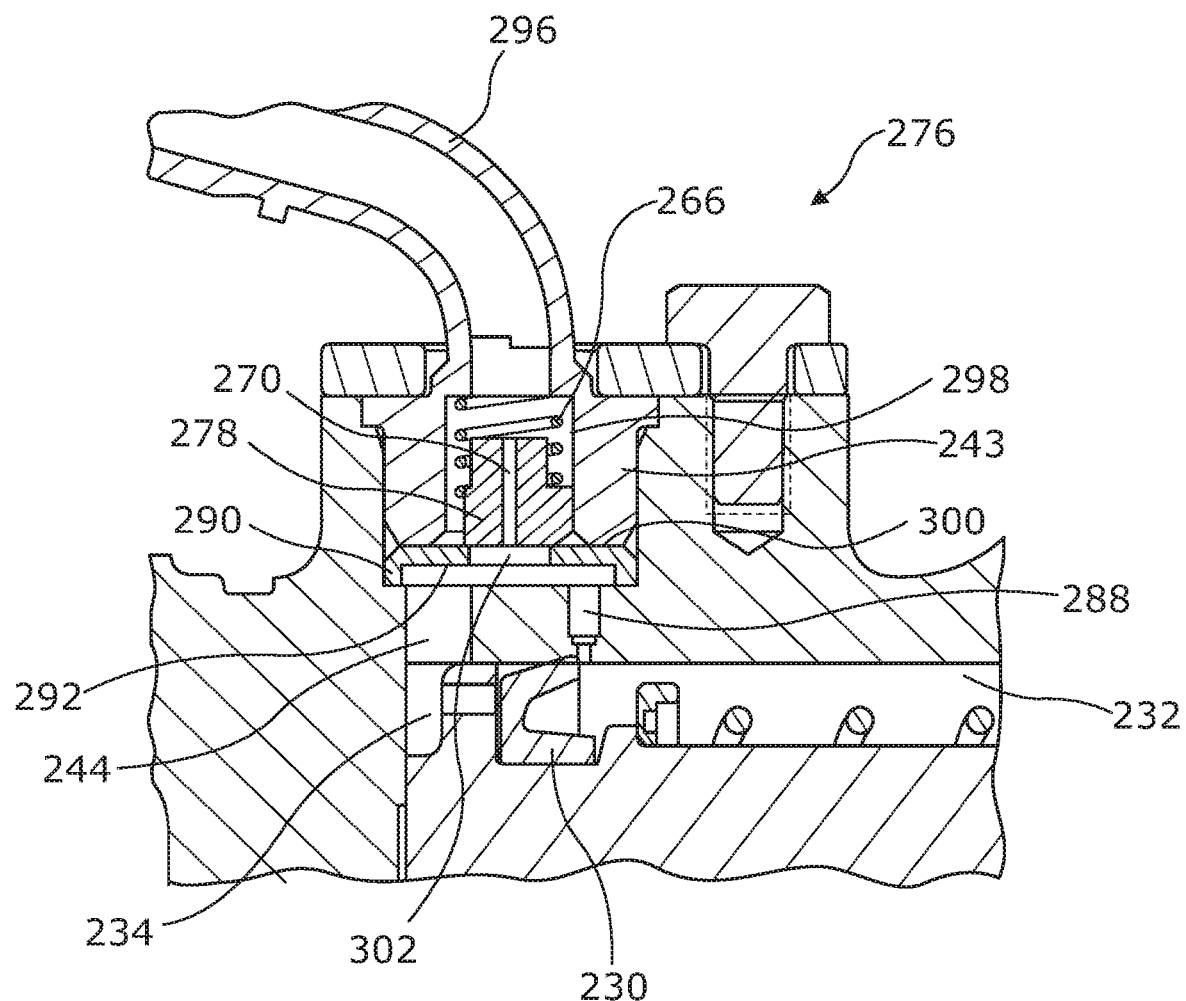

FIGS. 7 and 8 illustrate a further embodiment of a brake master cylinder 212 in accordance with an aspect of the invention. In this embodiment, the master cylinder 212 is as a pull type cylinder having a similar overall construction to that of the first embodiment 12. However, in this embodiment, the first and second flow paths for fluidly connecting the working chamber 232 to the fluid reservoir are provided in the reservoir port 242 rather than through the piston.

The brake master cylinder 212 has a cut-off port 288 for fluidly connecting the working chamber 232 with the reservoir port 242, and hence the reservoir itself, when the piston is in its retracted at rest position in which the brakes are not applied. In a manner well known in the art, the cut-off port 288 is located so as to open into the bore 222 just in front of the piston seal 230 when the piston is in the retracted position. This allows pressure in the system to dissipate fully when the brakes are released. When the piston 228 is advanced to apply the brakes, the piston seal 230 moves past the cut-off port 288 after only a very small amount of travel to isolate the working chamber 232 from the cut-off port 288 and the fluid reservoir so that the fluid in the working chamber 232 and hydraulic lines can be pressurised.

In accordance with the an embodiment of the invention, first and second flow paths are defined within the reservoir port 242 to fluidly connect the working chamber 232 to the reservoir through the cut-off port 288 when the piston 228 is in the retracted position. A concave insert 290 is located in the base of the reservoir port 242 to define a chamber 292 below the insert into which both the cut-off port 288 and the fluid passage 244 to the low pressure chamber 234 open. The insert 290 is held in place by a male fluid union member 243 which is engaged in the reservoir port 242 and which has an outlet conduit 296 to which a hydraulic line for connection with a fluid reservoir can be connected. The union 294 has an inner chamber which forms a fluid flow passage 298 into the outlet conduit. The insert has a planar upper wall 300 with a central orifice 302 which forms an inlet into the flow passage 298. A pressure relief valve 276 is located in the passage 298 to control the flow of fluid through the inlet orifice 302 into the passage 298. The valve 276 has a movable valve member 278 which is biased into contact with the outer surface of the upper wall 300 of the insert about the inlet orifice 302 by a compression spring 266 operative between the valve member 278 and the union member 294. A restricted port 270 extends through the valve member 278 to fluidly connect the inlet 302 with the flow passage 298 and the reservoir. The pressure relief valve 276 is arranged so as to open when subject to a higher fluid pressure on the inlet orifice side and the pressure differential across the valve member is at or above the threshold value. When the pressure relief valve 276 is opened, fluid is able flow through the inlet 302 into the passage 298 around the valve member 278 towards the reservoir. The minimum cross sectional area of the restricted port 270 is smaller than the minimum cross sectional area for fluid flow through the passage 298 when the pressure relief valve 276 is open.

Under normal operating conditions when the brakes are released and the piston 228 is in the retracted position, the working chamber 232 is fluidly connected with the reservoir via the cut-off port 288, the chamber 292, the inlet orifice 302, the restricted port 270, the fluid passageway 298, and the union member conduit 296. This allows all pressure in the system to dissipate in the usual way. If a knock-back event occurs whilst the piston is in the retracted position which gives rise to a pressure below the threshold value, fluid flowing in the return direction towards the reservoir is constrained to pass through the restricted port 270 in the valve member 278 so that the severity of the knock-back event is limited. Should a large knock-back event occur causing the pressure to spike above the threshold value, the pressure relief valve 276 will open to allow a larger, less restricted volume of fluid to pass about the valve member 278 towards the reservoir, allowing the excess pressure to dissipate quickly and reduce the risk of damage to the system.

Again it will be noted the first and second flow paths are located in the low pressure part of the system so that the pressurised fluid does not pass through them when the brakes are applied. As a consequence, this anti knock-back arrangement does not affect normal operation of the brakes.

Whilst the brake master cylinder 212 in accordance with the last embodiment is constructed as a pull type, the anti-knock back arrangement comprising a cut-off port 288 as described could be equally applied in a push type master cylinder.

The above embodiments are described by way of example only. Many variations are possible without departing from the scope of the invention as defined in the appended claims.

The invention claimed is:

1. A hydraulic brake master cylinder comprising:
a body having a bore,
a piston slidably mounted in the bore for movement between a retracted position and forward advanced positions, the piston having a seal which engages to bore to define a working chamber in the bore in front of the piston seal and a low pressure chamber behind the piston seal,
a pressure outlet port from the working chamber for connection with one or more brake cylinders;
wherein the piston comprises first and second fluid flow paths for fluidly connecting, in flow parallel, the working chamber with a source of ambient pressure when the piston is in the retracted position, the first fluid flow path having a minimum cross sectional area which is smaller than the minimum cross sectional area of the second fluid flow path,
a pressure relief valve in the second fluid flow path which is arranged to open to connect and to allow fluid flow from the working chamber to the source of ambient pressure through the second flow path when subject to a pressure differential across the valve at or above a threshold value, wherein the first fluid flow path is operably and fluidly connected to the source of ambient pressure when the pressure relief valve and the second fluid flow path are closed.

2. The brake master cylinder as claimed in claim 1, wherein the threshold value at which the pressure relief valve opens is set at 100 kPa or more.

3. The brake master cylinder as claimed in claim 1, wherein the source of ambient pressure is a brake fluid reservoir, the master cylinder having a reservoir port for fluid connection with the reservoir, the first and second flow paths fluidly connecting the working chamber with or through the reservoir port.

4. The brake master cylinder as claimed in claim 1, the brake master cylinder comprising a piston chamber defined within the piston, the piston chamber having an outlet directed into the low pressure chamber of the bore behind the piston seal, a pressure release valve for controlling the flow of fluid from the piston chamber into the low pressure chamber, which pressure release valve is opened when the piston is in the retracted position and which closes when the piston is moved away from the retracted position towards one of the advanced positions, the first flow path including at least one first port in the piston fluidly connecting the piston chamber with the working chamber, the second flow path including at least one second port in the piston fluidly connecting the piston chamber with the working chamber, the pressure relief valve arranged to control the flow of fluid into the piston chamber from the working chamber through the at least one second port.

5. The brake master cylinder as claimed in claim 4, wherein the pressure release valve comprises a release valve member located in the piston chamber and movable between a closed position in which it engages with a valve seat to close the outlet and an open position in which it is spaced from the valve seat to permit fluid to flow from the piston chamber in to the low pressure chamber through the outlet, the release valve member being biased towards the closed position by a resilient member, and a mechanism for moving the release valve member to the open position as the piston approaches the retracted position.

6. The brake master cylinder as claimed in claim 5, wherein the mechanism comprises a projection mounted to one of the body and the release valve member and which extends through the outlet for engagement with the other of the release valve member and the body when the piston is in the retracted position to move the release valve member to the open position.

7. The brake master cylinder as claimed in claim 4, wherein there are two or more first ports radially spaced apart, each first port fluidly connecting the piston chamber to the working chamber.

8. The brake master cylinder as claimed in claim 4, wherein the piston chamber has an inlet through which fluid passing through the at least one second port enters the piston chamber, the pressure relief valve being operative to control the flow of fluid through the inlet from the at least one second port in to the piston chamber.

9. The brake master cylinder as claimed in claim 8, wherein there are two or more second ports fluidly interconnected with the inlet to the piston chamber.

10. The brake master cylinder as claimed in claim 8, wherein the pressure relief valve comprises a relief valve member located in the piston chamber and which is biased into engagement with a valve seat to close the inlet to the piston chamber, the relief valve member being movable away from the valve seat to open a flow path through the inlet into the chamber when the pressure differential across the relief valve member is at or above said threshold value and the pressure release valve is open.

11. The brake master cylinder as claimed in claim 10, wherein the relief valve member and release valve member are both mounted in the piston chamber and are biased to their respective closed positions by a common compression spring operatively connected between them.

12. A vehicle braking system comprising a hydraulic brake master cylinder as claimed in claim 1, the outlet port of the brake master cylinder being fluidly connected with brake cylinders in at least one disc brake caliper.

13. A vehicle comprising a braking system as claimed in claim 12.

14. The brake master cylinder as claimed in claim 1, wherein the threshold value at which the pressure relief valve opens is set at 200 kPa or more.

15. The brake master cylinder as claimed in claim 1, wherein the threshold value at which the pressure relief valve opens is set in the range of 200 kPa to 300 kPa.

16. A hydraulic brake master cylinder comprising:
a body having a bore,
a piston slidably mounted in the bore for movement between a retracted position and forward advanced positions, the piston having a seal which engages to bore to define a working chamber in the bore in front of the piston seal and a low pressure chamber behind the piston seal,
a pressure outlet port from the working chamber for connection with one or more brake cylinders;
wherein the master cylinder defines first and second fluid flow paths for fluidly connecting the working chamber with a source of ambient pressure when the piston is in the retracted position, the first fluid flow path having a minimum cross sectional area which is smaller than the minimum cross sectional area of the second fluid flow path,
a pressure relief valve in the second fluid flow path which is arranged to open to connect and to allow fluid flow from the working chamber to the source of ambient pressure through the second flow path when subject to a pressure differential across the valve at or above a threshold value;
wherein the first and second fluid flow paths are at least partially defined through the piston;
the brake master cylinder further comprising a piston chamber defined within the piston, the piston chamber having an outlet directed into the low pressure chamber of the bore behind the piston seal, a pressure release valve for controlling the flow of fluid from the piston chamber into the low pressure chamber, which pressure release valve is opened when the piston is in the retracted position and which closes when the piston is moved away from the retracted position towards one of the advanced positions, the first flow path including at least one first port in the piston fluidly connecting the piston chamber with the working chamber, the second flow path including at least one second port in the piston fluidly connecting the piston chamber with the working chamber, the pressure relief valve arranged to control the flow of fluid into the piston chamber from the working chamber through the at least one second port,
wherein there are two or more first ports radially spaced apart, each first port fluidly connecting the piston chamber to the working chamber.

17. A hydraulic brake master cylinder comprising:
a body having a bore,
a piston slidably mounted in the bore for movement between a retracted position and forward advanced positions, the piston having a seal which engages to bore to define a working chamber in the bore in front of the piston seal and a low pressure chamber behind the piston seal,
a pressure outlet port from the working chamber for connection with one or more brake cylinders;
wherein the master cylinder defines first and second fluid flow paths for fluidly connecting the working chamber with a source of ambient pressure when the piston is in the retracted position, the first fluid flow path having a minimum cross sectional area which is smaller than the minimum cross sectional area of the second fluid flow path,
a pressure relief valve in the second fluid flow path which is arranged to open to connect and to allow fluid flow from the working chamber to the source of ambient pressure through the second flow path when subject to a pressure differential across the valve at or above a threshold value;
wherein the first and second fluid flow paths are at least partially defined through the piston;
the brake master cylinder further comprising: a piston chamber defined within the piston, the piston chamber having an outlet directed into the low pressure chamber of the bore behind the piston seal, a pressure release valve for controlling the flow of fluid from the piston chamber into the low pressure chamber, which pressure release valve is opened when the piston is in the retracted position and which closes when the piston is moved away from the retracted position towards one of the advanced positions, the first flow path including at least one first port in the piston fluidly connecting the piston chamber with the working chamber, the second flow path including at least one second port in the piston fluidly connecting the piston chamber with the working chamber, the pressure relief valve arranged to control the flow of fluid into the piston chamber from the working chamber through the at least one second port,
wherein the piston chamber has an inlet through which fluid passing through the at least one second port enters the piston chamber, the pressure relief valve being operative to control the flow of fluid through the inlet passage from the at least one second port in to the piston chamber,
wherein there are two or more second ports fluidly interconnected with the inlet passage to the piston chamber.

18. A brake master cylinder as claimed in claim 17, wherein the pressure relief valve comprises a relief valve member located in the piston chamber and which is biased into engagement with a valve seat to close the inlet to the piston chamber, the relief valve member being movable away from the valve seat to open a flow path through the inlet into the chamber when the pressure differential across the relief valve member is at or above said threshold value and the pressure release valve is open.

19. A brake master cylinder as claimed in claim 18, wherein the relief valve member and release valve member are both mounted in the piston chamber and are biased to their respective closed positions by a common compression spring operatively connected between them.

\* \* \* \* \*